United States Patent Office 3,117,120
Patented Jan. 7, 1964

3,117,120
PROCESSES FOR THE PRODUCTION OF 1 (AND 6,16)-SUBSTITUTED - 1 - DEHYDRO-11-KETOPROGESTERONES AND INTERMEDIATES THEREFOR
George B. Spero, Kalamazoo, Mich., assignor to The Upjohn Company, Kalamazoo, Mich., a corporation of Delaware
No Drawing. Filed July 5, 1962, Ser. No. 207,796
19 Claims. (Cl. 260—239.55)

This invention relates to certain novel steroid compounds and to processes for their preparation; it is more particularly concerned with processes for the production of 1-dehydro-1-alkyl (and aryl)-11-ketoprogesterones, the corresponding 6α-methyl and 6α,16-dimethyl derivatives thereof and intermediates therefor. It is also concerned with the novel steroid compounds 3-(2-hydroxyalkoxy)-11α-hydroxy-2,5-pregnadiene-1,20-dione, 11α-hydroxy-5-pregnene-1,3,20-trione 3-alkylene ketal 1-oxime, 5-pregnene-1,3,11-20-tetrone 3-alkylene ketal, 11α-acyloxy-5-pregnene-1,3,20-trione 3-alkylene ketal, their corresponding 6α-methyl and 6α,16(α or β)-dimethyl derivatives and processes for the preparation of all of these compounds.

The new compounds and processes of this invention are illustratively represented by the following reaction scheme:

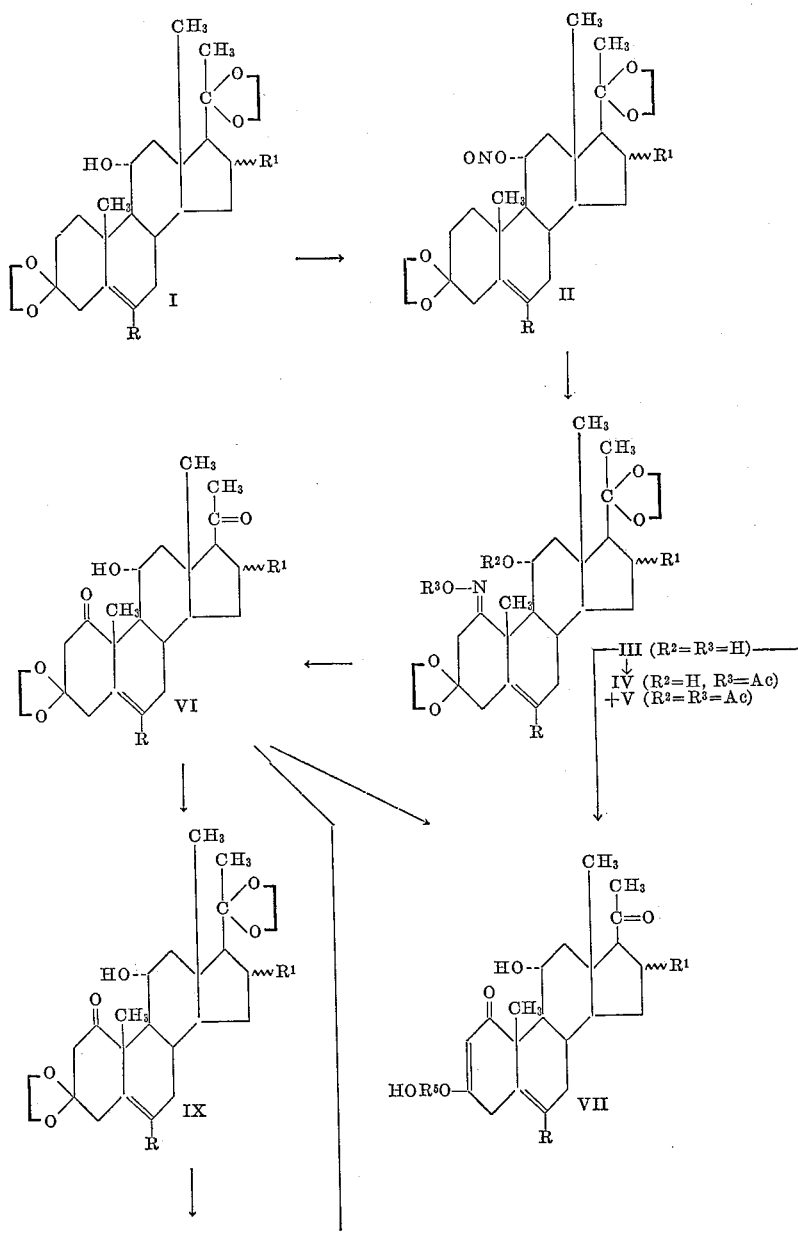

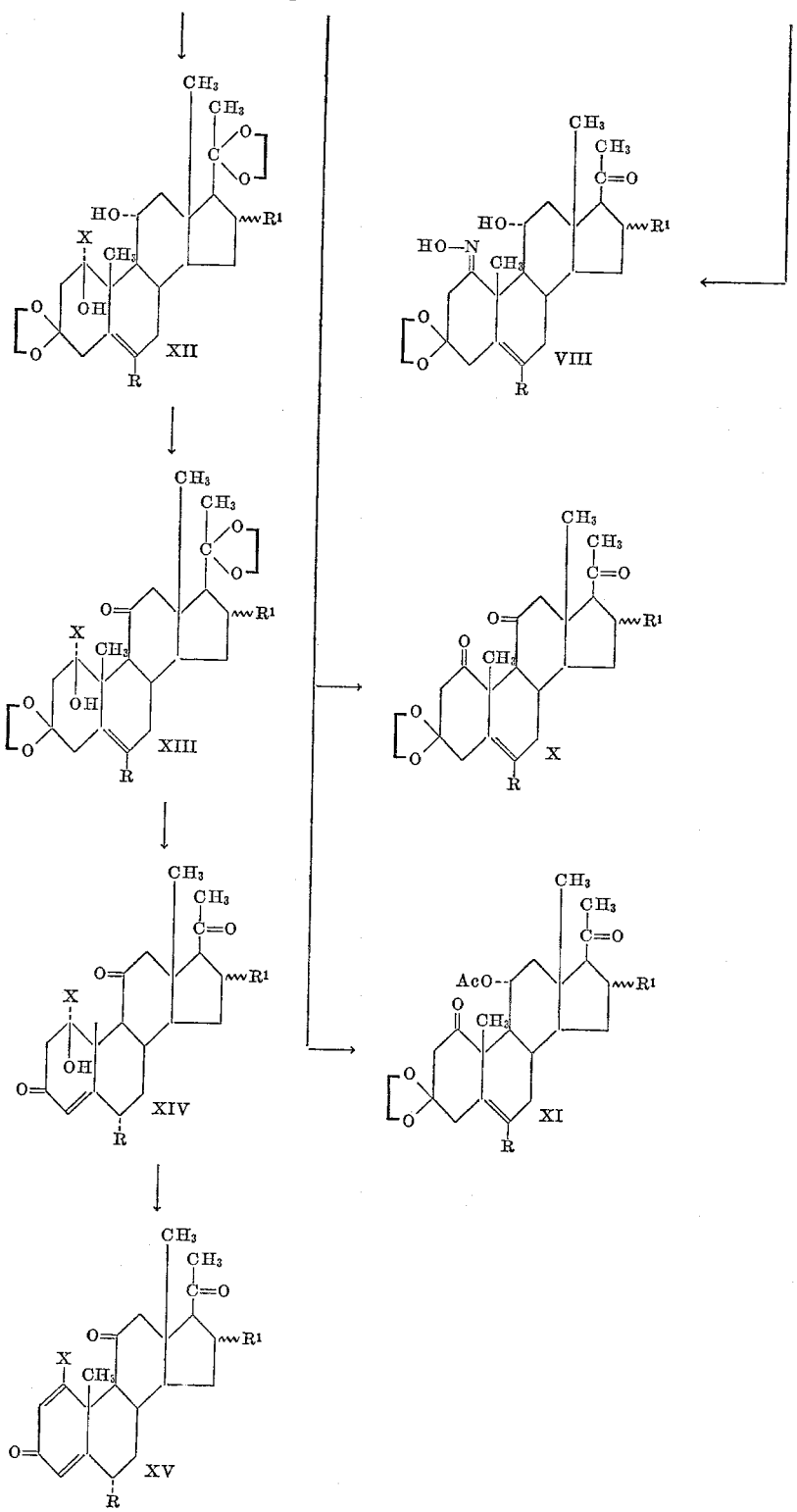

wherein the symbol

represents an alkylene ketal radical of the formula

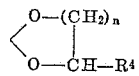

wherein $n$ is selected from the integers one and two and $R^4$ is selected from the group consisting of hydrogen and a lower-alkyl radical containing from one to six carbon atoms inclusive; $\sim$ is a generic expression denoting $\alpha$- and $\beta$- bonds and mixtures thereof; Ac is the acyl radical of an organic carboxylic acid containing from one to twelve carbon atoms, inclusive; R and $R^1$ are selected from the group consisting of hydrogen and methyl; $R^2$ and $R^3$ are selected from the group consisting of hydrogen and Ac, wherein Ac is defined as above; $R^5$ is a lower-alkylene radical containing from one to six carbon atoms, inclusive; X is selected from the group consisting of alkyl and aryl radicals, preferably containing from one to eight carbon atoms, inclusive.

The novel compounds of this invention embraced by

Formulae II to XV of the above flowsheet (and the corresponding androstane series compounds) possess valuable pharmacological properties such as tranquilizing, central nervous system depressing and lipid lowering activities. Consequently, they are useful in the treatment of nervous disorders, obesity and related illnesses in valuable domestic animals. The compounds of Formula XV are also useful as ice nucleators in cloud seeding.

The compounds of the present invention can be prepared and administered to mammals, birds and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspension, syrups, or elixirs.

The novel compounds of Formula II to XV of the flow sheet are prepared from the starting materials represented by Formula I thereof. Formula I embraces the following compounds:

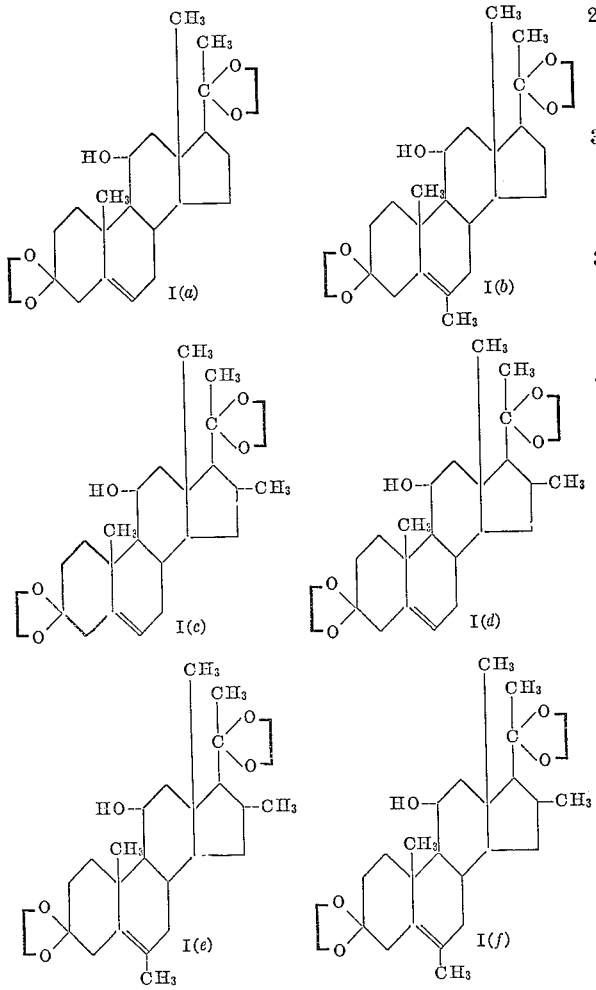

The compounds of Formula I(a) are obtained in the manner disclosed in Preparation 1 of U.S. Patent 2,968,655. The compounds of Formula I(b) are prepared from 6α-methyl-11α-hydroxyprogesterone (synthesized in Example 7 of U.S. Patent 2,968,655) and then subjecting said compound to 3,20-diketalization by following the procedure of Example 16B of the same patent. The compounds of Formula I(c) are prepared from 16α-methylprogesterone [J. Amer. Chem. Soc. 81, 3167 (1959)] by conversion to 11α-hydroxy-16α-methylprogesterone with *Rhizopus nigricans* (ATCC 6227b) by the procedure described in U.S. Patent 2,602,769; the thus-produced compound is further converted to a corresponding 3,20-bis (alkylene ketal) [I(c)] by the method disclosed in U.S. Patent 2,773,060, employing the ketal forming agents disclosed therein, i.e., an alkane-1,2-diol or alkane-1,3-diol such as ethylene glycol, propane-1,2-diol, butane-1,2-diol, hexane-1,3-diol and the like. The compounds of Formula I(d) are prepared by the same process utilized in obtaining the compounds of Formula I(c), except that the starting material is 16β-methylprogesterone [Bol. Inst. Quim. Univ. N. Auton. Mex. IV, 125 (1952); Chem. Abstracts 9400a (1954)]. The compounds of Formulae I(e) and I(f) are prepared by the same process employed in obtaining the compounds for Formula I(c), except that the starting steroids are 6α,16α-dimethylprogesterone [J. Org. Chem. 26, 2047 (1961)] and 6α,16β-dimethylprogesterone (British Patent 884,544), respectively.

The process for the preparation of the novel compounds of this invention comprises the following steps:

(1) The 11α-hydroxy-3,20-bis (alkylene ketals) represented by Formula I are nitrosylated, e.g., by reaction with a nitrosyl halide in an invert solvent at low temperature, to give the corresponding nitrite ester of Formula II.

(2) A thus-produced nitrite ester (II) dissolved in a nonpolar solvent (for example, toluene, benzene, cyclohexane) is subjected to irradiation from a source of ultraviolet light to obtain a 1-oxime of Formula III. A thus-produced compound of Formula III (wherein $R^2=R^3=$hydrogen) is readily acylated, e.g., by reaction with a lower-hydrocarbon carboxylic acid anhydride or halide in the presence of a tertiary base to yield compounds represented by Formula IV (wherein $R^2=$hydrogen and $R^3=$Ac) and Formula V (wherein $R^2=R^3=$Ac).

(3) A compound of Formula III (wherein $R^2=R^3=$hydrogen) is selectively hydrolized under mild conditions, for example, using a mineral acid in solution in a suitable solvent such as acetone or a lower-alkanol such as methanol, ethanol and the like to obtain an 11α-hydroxy-5-pregnene-1,3,20-trione 3-alkylene ketal (VI), a 3-(2-hydroxyalkoxy)-11α-hydroxy-2,5-pregnediene - 1,20-dione (VII) and an 11α-hydroxy-5-pregnene-1,3,20-trione 3-alkylene ketal, 1-oxime (VIII).

(4) The 20-keto group of a thus-obtained compound of Formula VI is ketalized using procedures known in the steroid art. For example, the compound (VI) is heated with the appropriate alkylene glycol in an inert solvent in the presence of an acid catalyst (e.g., p-toluenesulfonic acid) to yield an 11α-hydroxy-5-pregnene-1,3,20-trione 3,20-bis (alkylene ketal) (IX). The desired compound (IX) is isolated from the reaction mixture by conventional procedures, e.g., by removal of the solvent and purification of the residue by recrystallization, chromatography and the like. A compound of Formula VI can also be converted to a 3-(2-hydroxyalkoxy)-11α-hydroxy-2,5-pregnadiene-1,20-dione (VII) by reacting the former with a metal acylate in an appropriate solvent, for example, ethanol. Oxidation of a compound of Formula VI, e.g., with chromium trioxide-pyridine complex gives a 5-pregnene-1,3,20-tetrone-3-alkylene ketal (X). A compound of Formula VI is readily acylated, e.g., by reaction with a lower-hydrocarbon carboxylic acid anhydride or halide in the presence of a tertiary base to give an 11α-acyloxy-5-pregnene-1,3,20-trione 3-alkylene ketal (XI).

(5) In the next step of the process an 11α-hydroxy-5-pregnene-1,3,20-trione-3,20-bis (alkylene ketal) (IX) is reacted with an alkyl or aryl metal compound, e.g., an alkyl (or aryl) Grignard reagent or an alkyl (or aryl) lithium, to give a 1α-alkyl (or aryl)-1β,11α-dihydroxy-5-pregnene-3,20-dione 3,20-bis (alkylene ketal) (XII).

(6) Oxidation of a thus-produced compound of Formula XII, e.g., with chromium trioxide-pyridine complex, yields a corresponding 11-keto steroid, namely, a 1α-alkyl (or aryl)-1β-hydroxy-5-pregnene-3,11,20-trione 3,20-bis (alkylene ketal) (XIII).

(7) The ketal groups at the 3- and 20-positions of a compound represented by Formula XIII are hydrolyzed, for example, by employing a mineral acid in solution in a suitable solvent such as acetone or a lower-alkanol, e.g., methanol, ethanol, isopropanol and the like, to obtain the corresponding 1α-alkyl (or aryl)-1β-hydroxy-4-pregnene-3,11,20-trione (XIV).

(8) The final step of the process of this invention involves the dehydration of a thus-produced 1α-alkyl (or aryl)-1β-hydroxy-4-pregnene-3,11,20-trione (XIV), e.g., by reaction with acetic acid, p-toluenesulfonic acid or sulfonyl chloride in pyridine, to give a 1-alkyl (or aryl)-1,4-pregnadiene-3,11,20-trione (XV).

Following the procedures of steps (1) through (8), above, but substituting for the starting materials of I(a) through I(f), above, an 11α-hydroxyandrostene-3,17-dione 3,17-bis (alkylene ketal) of the formula

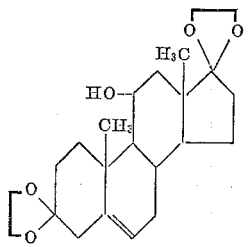

yields, respectively, in the steps indicated:

(1) the nitrite ester of a 5-androstene-11α-hydroxy-1,3,17-trione 3,17-bis (alkylene ketal);
(2) a 5-androstene-11α-hydroxy-1,3,17-trione 3,17-bis (alkylene ketal), 1-oxime, a 5-androstene-11α-hydroxy-1,3,17-trione (alkylene ketal), 1-acyloxime and a 5-androstene-11α-hydroxy-1,3,17-trione 3,17-bis (alkylene ketal) 1-acyloxyoxime 11-acylate;
(3) a 5-androstene-11α-hydroxy-1,3,17-trione 3-alkylene ketal, a 2,5-androstadiene-3-hydroxyalkoxy-11α-hydroxy-1,17-dione and a 5-androstene-11α-hydroxy-1,3,17-trione 3-alkylene ketal, 1-oxime;
(4) a 5-androstene-11α-hydroxy-1,3,17-trione 3,17-bis (alkylene ketal), a 2,5-androstadiene-3-hydroxyalkoxy-11α-hydroxy-1,17-dione, a 5-androstene-1,3,11,17-tetrone 3-alkylene ketal and an 11α-acyloxy-5-androstene-1,3,17-trione 3-alkylene ketal;
(5) a 1α-alkyl (or aryl)-5-androstene-1β,11β-dihydroxy-3,17-dione 3,17-bis (alkylene ketal);
(6) a 1α-alkyl (or aryl)-5-androstene-1β-hydroxy-3,11,17-trione 3,17-bis (alkylene ketal);
(7) a 1α-alkyl (or aryl)-4-androstene-1β-hydroxy-3,11,17-trione and
(8) a 1-alkyl (or aryl)-1,4-androstadiene-3,11,17-trione.

The starting steroid, an 11α-hydroxyandrostene-3,17-dione 3,17-bis (alkylene ketal), is prepared from the known corresponding 3,17-diketo compounds (obtained in the manner disclosed in Example 28 of U.S. Patent 2,602,769) by diketalization in accordance with the procedures disclosed in U.S. Patent 2,773,060.

EXAMPLE 1

(a) Nitrite Ester of 11α-Hydroxy-5-Pregnene-3,20-Dione 3,20-Bis (Ethylene Ketal) [Nitrite Ester of 11α-Hydroxyprogesterone 3,20-Bis (Ethylene Ketal)] (II)

(b) 11α - Hydroxy - 5 - Pregnene-1,3,20-Trione 3,20 - Bis (Ethylene Ketal) 1-Oxime [11α-Hydroxyprogesterone 3,20-Bis (Ethylene Ketal) 1-Oxime] (III)

(a) 2 g. of 11α-hydroxyprogesterone 3,20-bis (ethylene ketal) (I) (prepared in the manner disclosed in Preparation 1 of U.S. Patent 2,968,655) was dissolved in 20 ml. of pyridine and cooled in an ice-bath. To the cold solution 2 ml. of nitrosyl chloride was added dropwise, with shaking, over a period of about 5 minutes. After standing in the cold for a period of about 15 minutes and at room temperature for about one hour, the reaction mixture was poured into a mixture of ice and water and the resulting crude solid isolated, washed with water and dissolved in 200 ml. of toluene. The toluene solution was washed successively with 5% hydrochloric acid solution, 5α sodium bicarbonate solution, water and then dried and brought to a volume of 260 ml. with toluene. The infrared absorption spectrum of the solution showed the absence of the hydroxy group and the presence of a nitrite function at the 11α-position, i.e., at $1635^{cm.-1}$, indicating the formation of the nitrite ester of 11α-hydroxy-5-pregnene-3,20-dione 3,20-bis (ethylene ketal) (II).

(b) The toluene solution (II) was irradiated for a period of about 2 hours at 20° C. with a 200 watt Hanovia ultraviolet lamp having a Pyrex (Corning Glass Works) filter. Chromatography of the reaction mixture over a column of Florisil (synthetic magnesium silicates) yielded (in addition to a small amount of starting material) a product fraction of 204 mg., obtained by elution of the column with 15% acetone in Skellysolve B (hexanes). Crystallization of the product (III) from a mixture of acetone and Skellysolve B gave 161 mg. melting at 194 to 199° C. The analytical sample of the thus-obtained, pure 11α-hydroxy-5-pregnene-1,3,20-trione 3,20-bis (ethylene ketal) 1-oxime (III), melted at 197 to 199° C. with a rotation $[\alpha]_D + 109°$ (acetone) and a nuclear magnetic resonance spectrum in agreement with the expected structure.

Analysis.—Calcd. for $C_{25}H_{37}O_6N$: N, 3.13. Found: N, 3.41.

Following the procedure of Example 1 but substituting as starting material for 11α-hydroxyprogesterone 3,20-bis (ethylene ketal) (I), other 3,20-bis (alkylene ketals) of 11α-hydroxyprogesterone (I), yields the corresponding nitrite ester of 11α-hydroxy-5-pregnene-3,20-dione 3,20-bis (alkylene ketal) (II) and 11α-hydroxy-5-pregnene-1,3,20-trione 3,20-bis (alkylene ketal) 1-oxime (III).

Following the procedure of Example 1, but substituting for 11α-hydroxyprogesterone 3,20-bis (ethylene ketal) (I), the following starting materials:

(1) an 11α-hydroxy-6-methylprogesterone 3,20-bis (alkylene ketal) (I),
(2) an 11α-hydroxy-16α-methylprogesterone 3,20-bis (alkylene ketal) (I),
(3) an 11α-hydroxy - 16β - methylprogesterone 3,20-bis (alkylene ketal) (I),
(4) a 6,16α-dimethyl-11α-hydroxyprogesterone 3,20-bis (alkylene ketal) (I),
(5) a 6,16β-dimethyl-11α-hydroxyprogesterone 3,20-bis (alkylene ketal) (I) and
(6) a 5-androstene-3,17-dione-11α-hydroxy 3,17-bis (alkylene ketal), yields, respectively, (1a) the nitrite ester of an 11α-hydroxy-6-methyl-5-pregnene-1,3,20-trione 3,20-bis (alkylene ketal) (II),
(2a) the nitrite ester of an 11α-hydroxy-16α-methyl-5-pregnene-1,3,20-trione 3,20-bis (alkylene ketal) (II),
(3a) the nitrite ester of an 11α-hydroxy-16β-methyl-5-pregnene-1,3,20-trione 3,20-bis (alkylene ketal) (II),
(4a) the nitrite ester of a 6,16α-dimethyl-11α-hydroxy-5-pregnene-1,3,20-trione 3,20-bis (alkylene ketal) (II),
(5a) the nitrite ester of a 6,16β-dimethyl-11α-hydroxy-5-pregnene-1,3,20-trione 3,20-bis (alkylene ketal) (II) and
(6a) the nitrite ester of a 5-androstene-11α-hydroxy-1,3,17-trione 3,17-bis (alkylene ketal);

(1b) an 11α-hydroxy-6-methyl-5-pregnene-1,3,20-trione 3,20-bis (alkylene ketal) 1-oxime (III),
(2b) an 11α-hydroxy-16α-methyl-5-pregnene-13,20-trione 3,20-bis (alkylene ketal) 1-oxime (III), (3b) an 11α-hydroxy-16β-methyl-5-pregnene-1,3,20-trione 3,20-bis (alkylene ketal) 1-oxime (III),
(4b) a 6,16α-dimethyl-11α-hydroxy-5-pregnene-1,3,20-trione 3,20-bis (alkylene ketal) 1-oxime (III),
(5b) a 6,16β-dimethyl-11α-hydroxy-5-pregnene-1,3,20-trione 3,20-bis (alkylene ketal) 1-oxime (III) and
(6b) a 6-androstene-11α-hydroxy-1,3,17-trione 3,17-bis (alkylene ketal) 1-oxime.

EXAMPLE 2

(a) *11α-Hydroxy-5-Pregnene - 1,3,20 - Trione 3,20 - Bis (Ethylene Ketal) 1-Acetyloxime (IV)*

(b) *11α-Hydroxy-5-Pregnene - 1,3,20 - Trione 3,20 - Bis (Ethylene Ketal) 1-Acetoxyoxime 11-Acetate (V)*

(a) 0.5 g. of 11α-hydroxy-5-pregnene-1,3,20-trione 3,20-bis (ethylene ketal) 1-oxime (III) (from Example 1) was dissolved in 5 ml. of pyridine and 5 ml. of acetic anhydride. The reaction solution was allowed to stand at room temperature for a period of about 15 hours and then poured into a mixture of ice and water. The resulting crude solid was extracted with methylene chloride and the methylene chloride solution washed successively with dilute hydrochloric acid, dilute sodium bicarbonate solution and water; it was then dried and chromatographed over a column of Florisil. One long fraction containing 464 mg. of solid material was recovered from the column and crystallized from ether to give 270 mg. of product (IV) melting at 160 to 164° C. An analytical sample of the thus obtained pure 11α-hydroxy-5-pregnene-1,3,20-trione 3,20-bis (ethylene ketal) 1-acetyloxime (IV) had a melting point of 165 to 167° C. and a rotation $[\alpha]_D$ of +140° (acetone).

*Analysis.*—Calcd. for $C_{27}H_{37}O_7N$: C, 66.23; H, 8.03; N, 2.86. Found: C, 66.49; H, 7.99; N, 2.87.

(b) The ether mother liquor, from which the monoacetate (IV) was removed, on standing at room temperature gave a second crop of 92 mg. of crystals (V) melting at 192 to 200° C. An analytical sample, recrystallized from a mixture of acetone and Skellysolve B gave pure 11α-hydroxy-5-pregnene-1,3,20-trione 3,20-bis (ethylene ketal) 1-acetoxyoxime 11-acetate (V) with a melting point of 196 to 200° C.

*Analysis.*—Calcd. for $C_{29}H_{41}O_8N$: C, 65.51; H, 7.77; N, 2.63. Found: C, 65.63; H, 8.14; N, 2.66.

Following the procedure of Example 2, but substituting as starting material for 11α-hydroxy-5-pregnene-1,3,20-trione 3,20-bis (ethylene ketal) 1-oxime (III), other 3,20-bis (alkylene ketals) of 11α-hydroxy-5-pregnene-1,3,20-trione (III), yields the corresponding 11α-hydroxy-5-pregnene-1,3,20-trione 3,20-bis (alkylene ketal) 1-acetyloxime (IV) and 11α-hydroxy-5-pregnene-1,3,20-trione 3,20-bis (alkylene ketal) 1-acetoxyoxime 11-acetate (V).

Following the procedure of Example 2, but substituting another lower-hydrocarbon carboxylic acid anhydride for acetic anhydride, is productive of other 11α-hydroxy-5-pregnene-1,3,20-trione 3,20-bis (alkylene ketal) 1-acyloximes (IV) and the corresponding 11-acylates (V). For example, the anhydrides of butyric, diethylacetic, β-cyclopentylpropionic, benzoic and phenylpropionic acids can be employed.

Following the procedure of Example 2, but substituting for 11α-hydroxy-5-pregnene-1,3,20-trione 320-bis (ethylene ketal) 1-oxime (III), the following starting materials:
(1) an 11α-hydroxy-6-methyl-5-pregnene-1,3,20-trione 3,20-bis (alkylene ketal) 1-oxime (III),
(2) an 11α-hydroxy-16α-methyl-5-pregnene-1,3,20-trione 3,20-bis (alkylene ketal) 1-oxime (III),
(3) an 11α-hydroxy-16β-methyl-5-pregnene-1,3,20-trione 3,20-bis (alkylene ketal) 1-oxime (III),
(4) a 6,16α-dimethyl-11α-hydroxy-5-pregnene-1,3,20-trione 3,20-bis (alkylene ketal) 1-oxime (III),
(5) a 6,16β-dimethyl-11α-hydroxy-5-pregnene-1,3,20-trione 3,20-bis (alkylene ketal) 1-oxime (III) and
(6) a 5-androstene-11α-hydroxy-1,3,17-trione 3,17-bis (alkylene ketal) 1-oxime, yields, respectively, (1a) an 11α-hydroxy-6-methyl-5-pregnene-1,3,20-trione 3,20-bis (alkylene ketal) 1-acyloxime (IV),
(2a) an 11α-hydroxy-16α-methyl-5-pregnene-1,3,20-trione 3,20-bis (alkylene ketal) 1-acyloxime (IV),
(3a) an 11α-hydroxy-16β-methyl-5-pregnene-1,3,20-trione 3,20-bis (alkylene ketal) 1-acyloxime (IV),
(4a) a 6,16α-dimethyl-11α-hydroxy-5-pregnene-1,3,20-trione 3,20-bis (alkylene ketal) 1-acyloxime (IV),
(5a) a 6,16β-dimethyl-11α-hydroxy-5-pregnene-1,3,20-trione 3,20-bis (alkylene ketal) 1-acyloxime (IV) and
(6a) a 5-androstene-11α-hydroxy-1,3,17-trione 3,17-bis (alkylene ketal) 1-acyloxime;

(1b) an 11α-hydroxy-6-methyl-5-pregnene-1,3,20-trione 3,20-bis (alkylene ketal) 1-acyloxyoxime 11-acylate (V),
(2b) an 11α-hydroxy-16α-methyl-5-pregnene-1,3,20-trione 3,20-bis (alkylene ketal) 1-acyloxyoxime 11-acylate (V),
(3b) an 11α-hydroxy-16β-methyl-5-pregnene-1,3,20-trione 3,20-bis (alkylene ketal) 1-acyloxyoxime 11-acylate (V),
(4b) a 6,16α-dimehtyl-11α-hydroxy-5-pregnene-1,3,20-trione 3,20-bis (alkylene ketal) 1-acyloxyoxime 11-acylate (V),
(5b) a 6,16β-dimethyl-11α-hydroxy-5-pregnene-1,3,20-trione 3,20-bis (alkylene ketal) 1-acyloxyoxime 11-acylate (V) and
(6b) a 5-androstene-11α-hydroxy-1,3,17-trione 3,17-bis (alkylene ketal) 1-acyloxyoxime 11-acylate.

EXAMPLE 3

(a) *11αHydroxy-5-Pregnene-1,3,20-Trione 3-Ethylene Ketal (VI)*

(b) *11α-Hydroxy-5-Pregnene-1,3,20-Trione 3-Ethylene Ketal, 1-Oxime (VIII)*

(c) *3-(2-Hydroxyethoxy)-11α-Hydroxy-2,5-Pregnadiene-1,20-Dione (VII)*

5 g. of 11α-hydroxy-5-pregnene-1,3,20-trione 3,20-bis (ethylene ketal) 1-oxime (III) (from Example 1) was dissolved in 450 ml. of acetone and 50 ml. of 1 N sulfuric acid added. The solution was allowed to stand at room temperature for a period of about 15 hours, then diluted with 100 ml. of water and concentrated to a volume of about 100 ml. under reduced pressure on a water bath whose temperature was 25° C. or lower. The resulting cloudy mixture was extracted with methylene chloride and with ethyl actate. The extracts were washed with water, dried and evaporated to dryness. The residue was chromatographed over Florisil and gave three fractions: *a*, 2.652 g. (eluted with a mixture of Skellysolve B and acetone, 85:15); *b*, 551 mg. (eluted with a mixture of Skellysolve B and acetone 80:20); *c*, 410 mg. (eluted with a mixture of Skellysolve B and actone 70:30).

(a) Fraction *a* was recrystallized from acetone to give 2.053 g. of product (VI) with a melting point of 174 to 177° C. An analytic sample of this compound, 11α-hydroxy-5-pregnene-1,3,20-trione 3-ethylene ketal (VI), melted at 175 to 177° C. and had a rotation $[\alpha]_D$ of +95° (acetone).

*Analysis.*—Calcd. for $C_{23}H_{32}O_5$: C, 71.10; H, 8.30. Found: C, 71.34; H, 8.32.

(b) Fraction *b* was crystallized from a mixture of acetone and Skellysolve B to give 287 mg. of product (VIII) with a melting point of 198 to 210° C. An analytical sample of this compound, 11α-hydroxy-5-pregnene-1,3,20-trione 3-ethylene ketal, 1-oxime (VIII), melted at 224 to 226° C.

(c) Fraction *c* was crystallized from a mixture of acetone and Skellysolve B to give 180 mg. of product (VII) with a melting point of 149 to 155° C. An analytical sample of this compound, 3-(2-hydroxyethoxy)-11α-hydroxy-2,5-pregnadiene-1,20-dione (VII), melted at 151 to 153° C. and 174 to 176° C. with a rotation $[\alpha]_D$ of +184° (acetone); λ max. 256 mμ (ε=16,650).

*Analysis.*—Calcd. for $C_{23}H_{32}O_5$: C, 71.10; H, 8.30. Found: C, 71.15; H, 8.19.

The following alternative method also is productive of 3-(2-hydroxyethoxy)11α-hydroxy-2,5-pregnadiene - 1,20-dione (VII).

(*d*) To a solution 900 mg. of 11α-hydroxy-5-pregnene-1,3,20-trione 3-ethylene ketal (VI), prepared as in Example 3(*a*), was added 900 mg. of anhydrous sodium acetate. The mixture was heated at reflux for a period of about 3 hours and then evaporated to dryness under reduced pressure while being heated at about 60° C. on a water bath. The residue was dissolved in ethyl acetate—water and the ethyl acetate separated, washed with water, and dried. The ethyl acetate solution was evaporated to give a residue which was crystallized from acetone-Skellysolve B to give 677 mg. of 3-(2-hydroxethoxy)-11α-hydroxy-2,5β-pregnadiene-1,20-dione (VII) with a melting point of 155 to 157° C.

Following the procedure of Example 3(*a*) but substituting as starting material for 11α-hydroxy-5-pregnene-1,3,20-trione 3,20-bis (ethylene ketal) 1-oxime (III), other 3,20-bis (alkylene ketals) of 11α-hydroxy-5-pregnene-1,3,20-trione 1-oxime (III), yields the corresponding 11α-hydroxy-5-pregnene - 1,3,20 - trione 3-alkylene ketal (VI).

Following the procedure of Example 3(*b*) but substituting as starting material for 11α-hydroxy-5-pregnene-1,3,20-trione 3,20-bis (ethylene ketal) 1-oxime (III), other 3,20-bis (alkylene ketals) of 11-α-hydroxy-5-pregnene-1,3,20-trione 1-oxime (III), yields the corresponding 11α-hydroxy-5-pregnene - 1,3,20 - trione 3-alkylene ketal, 1-oxime (VIII).

Following the procedure of Example 3(*c*) but substituting as starting material for 11α-hydroxy-5-pregnene-1,3,20-trione 3,20-bis (ethylene ketal) 1-oxime (III), other 3,20-bis (alkylene ketals) of 11α-hydroxy-5-pregnene-1,3,20-trione (III), yields the corresponding 3-hydroxyalkoxy-11α-hydroxy - 2,5 - pregnadiene-1,20-dione (VII); e.g., employing the starting compound 11α-hydroxy-5-pregnene - 1,3,20 - trione 3,20-bis (n-propylene ketal) 1-oxime (III) yields 3-(3-hydroxy-n-propoxy)-11α-hydroxy-2,5-pregnadiene-1,20-dione (VII).

Following the procedure of Example 3(*d*) but substituting as starting material for 11α-hydroxy-5-pregnene-1,3,20-trione 3-ethylene ketal (VI), other 3-alkylene ketals of 11α-hydroxy-5-pregnene - 1,3,20 - trione (VI), yields the corresponding 3-hydroxyalkoxy-11α-hydroxy-2,5-pregnadiene-1,20-dione (VII); e.g., employing the starting compound 11α-hydroxy-5-pregnene-1,3,20-trione 3-n-butylene ketal (VI) yields 3-(4-hydroxy-n-butoxy)-11α-hydroxy-2,5-pregnadiene-1,20-dione (VII).

Following the procedure of Example 3, but substituting for 11α-hydroxy-5-pregnene-1,3,20-trione, 3,20-bis (ethylene ketal) 1-oxime (III), the following starting materials:

(1) an 11α-hydroxy-6-methyl-5-pregnene-1,3,20,-trione 3,20-bis (alkylene ketal) 1-oxime (III),
(2) an 11α-hydroxy-16α-methyl-5-pregnene-1,3,20-trione 3,20-bis (alkylene ketal) 1-oxime (III),
(3) an 11α-hydroxy-16β-methyl-5-pregnene-1,3,20-trione 3,20-bis (alkylene ketal) 1-oxime (III),
(4) a 6,16α-dimethyl-11α-hydroxy-5-pregnene-1,3,20-trione 3,20-bis (alkylene ketal) 1-oxime (III),
(5) a 6,16β-dimethyl-11α-hydroxy-5-pregnene-1,3,20-trione 3,20-bis (alkylene ketal) 1-oxime (III) and
(6) a 5-androstene-11α-hydroxy-1,3,17-trione 3,17-bis (alkylene ketal) 1-oxime, yields, respectively, (1*a*) an 11α-hydroxy-6-methyl-5-pregnene-1,3,20-trione 3-alkylene ketal (VI),
(2*a*) an 11α-hydroxy-16α-methyl-5-pregnene-1,3,20-trione 3-alkylene ketal (VI),
(3*a*) an 11α-hydroxy-16β-methyl-5-pregnene-1,3,20-trione 3-alkylene ketal (VI),
(4*a*) a 6,16α-dimethyl-11α-hydroxy-5-pregnene-1,3,20-trione 3-alkylene ketal (VI),
(5*a*) a 6,16β-dimethyl-11α-hydroxy-5-pregnene-1,3,20-trione 3-alkylene ketal (VI) and
(6*a*) a 5-androstene-11α-hydroxy-1,3,17-trione 3-alkylene ketal;

(1*b*) an 11α-hydroxy-6-methyl-5-pregnene-1,3,20-trione 3-alkylene ketal, 1-oxime (VIII),
(2*b*) an 11α-hydroxy-16α-methyl-5-pregnene-1,3,20-trione 3-alkylene ketal, 1-oxime (VIII),
(3*b*) an 11α-hydroxy-16β-methyl-5-pregnene-1,3,20-trione 3-alkylene ketal, 1-oxime (VIII),
(4*b*) a 6,16α-dimethyl-11α-hydroxy-5-pregnene-1,3,20-trione 3-alkylene ketal, 1-oxime (VIII),
(5*b*) a 6,16β-dimethyl-11α-hydroxy-5-pregnene-1,3,20-trione 3-alkylene ketal, 1-oxime (VIII) and
(6*b*) a 5-androstene-11α-hydroxy-1,3,17-trione 3-alkylene ketal 1-oxime;

(1*c*) a 3-hydroxyalkoxy-6-methyl-11α-hydroxy-2,5-pregnadiene-1,20-dione (VII),
(2*c*) a 3-hydroxyalkoxy-16α-methyl-11α-hydroxy-2,5-pregnadiene-1,20-dione (VII),
(3*c*) a 3-hydroxyalkoxy-16β-methyl-11α-hydroxy-2,5-pregnadiene-1,20-dione (VII),
(4*c*) a 6,16α-dimethyl-3-hydroxyalkoxy-11α-hydroxy-2,5-pregnadiene-1,20-dione (VII),
(5*c*) a 6,16β-dimethyl-3-hydroxyalkoxy-11α-hydroxy-2,5-pregnadiene-1,20-dione (VII) and
(6*c*) a 2,5-androstadiene-3-hydroxyalkoxy-11α-hydroxy-1,17-dione.

Following the procedure of Example 3(*d*) but substituting for 11α-hydroxy-5-pregnene-1,3,20-trione 3-ethylene ketal (VI), the following starting materials:

(1) an 11α-hydroxy-6-methyl-5-pregnene-1,3,20-trione 3-alkylene ketal (VI),
(2) an 11α-hydroxy-16αmethyl-5-pregnene-1,3,20-trione 3-alkylene ketal (VI),
(3) an 11α-hydroxy-16β-methyl-5-pregnene-1,3,20-trione 3-alkylene ketal (VI),
(4) a 6,16α - dimethyl - 11α-hydroxy-5-pregnene-1,3,20-trione 3-alkylene ketal (VI),
(5) a 6,16β - methyl - 11α - hydroxy-5-pregnene - 1,3,20-trione 3-alkylene ketal (VI) and
(6) a 5-androstene-11α-hydroxy-1,2,17-trione 3-alkylene ketal, yields, respectively, the compounds (VII) of (1*c*), (2*c*), (3*c*), (4*c*), (5*c*) and (6*c*), above.

EXAMPLE 4

*5-Pregnene-1,3,11,20-Tetrone 3-Ethylene Ketal (X)*

Chromium trioxide-pyridine complex was prepared by the portionwise addition of 0.6 g. of chromium trioxide to 6 ml. of pyridine while the temperature of the reagent was kept at about or below room temperature. To this complex a solution of 320 mg. of 11α-hydroxy-5-pregnene-1,3,20-trione 3-ethylene ketal (VI) [from Example 3(*a*)] in 6 ml. of pyridine was added and the mixture allowed to stand at room temperature for a period of about 16 hours. The reaction mixture was diluted with 150 ml. of water and extracted with ethyl acetate. The ethyl acetate solution was washed with dilute hydrochloric acid and with water and then dried and evaporated to dryness to give 0.32 g. of crude solid. Cyrstallization from a mixture of acetone and Skellysolve B gave 245 mg. of product having a melting point of 200 to 205° C. An analytical sample of this material, 5-pregnene-1,3,11,20-tetrone 3-ethylene ketal (X), melted at 207 to 210° C. and had a rotation $[\alpha]_D$ of +77° (acetone).

*Analysis.*—Calcd. for $C_{28}H_{30}O_5$: C, 71.48; H, 7.82. Found: C, 71.65; H, 7.88.

Following the procedure of Example 4 but substituting as starting material for 11α-hydroxy-5-pregnene-1,3,20-trione 3-ethylene ketal (VI), other 3-alkylene ketals of 11α-hydroxy-5-pregnene-1,3,20-trione (VI), yields the corresponding 5-pregnene-1,3,11,20-tetrone 3-alkylene ketal (X).

Following the procedure of Example 4 but substituting for 11α-hydroxy-5-pregnene-1,3,20-trione 3-ethylene ketal (VI), the following starting materials:

(1) an 11α-hydroxy-6-methyl-5-pregnene-1,3,20-trione 3-alkylene ketal (VI),
(2) an 11α-hydroxy-16α-methyl-5-pregnene-1,3,20-trione 3-alkylene ketal (VI),
(3) an 11α-hydroxy-16β-methyl-5-pregnene-1,3,20-trione 3-alkylene ketal (VI),
(4) a 6,16α - dimethyl-11α-hydroxy-5-pregnene - 1,3,20-trione 3-alkylene ketal (VI),
(5) a 6,16β - dimethyl-11α-hydroxy-5-pregnene - 1,3,20-trione 3-alkylene ketal (VI), and
(6) a 5-androstene-11α-hydroxy-1,3,17-trione 3-alkylene ketal, yields, respectively, (1) a 6 - methyl-5-pregnene-1,3,11,20-tetrone 3-alkylene ketal (X),
(2) a 16α - methyl-5-pregnene-1,3,11,20-tetrone 3-alkylene ketal (X),
(3) a 16β - methyl-5-pregnene-1,3,11,20-tetrone 3-alkylene ketal (X),
(4) a 6,16α - dimethyl-5-pregnene - 1,3,11,20 - tetrone 3-alkylene ketal (X),
(5) a 6,16β - dimethyl-5-pregnene - 1,3,11,20 - tetrone 3-alkylene ketal (X) and
(6) a 5-androstene-1,3,11,17-tetrone 3-alkylene ketal.

EXAMPLE 5

*11α-Acetoxy-5-Pregnene-1,3,20-Trione 3-Ethylene Ketal (XI)*

A solution of 200 mg. of 11α-hydroxy-5-pregnene-1,3,20-trione 3-ethylene ketal (VI) [from Example 3(a)] in 2 ml. of pyridine and 2 ml. of acetic anhydride was allowed to stand at room temperature for a period of about 16 hours and then poured in a mixture of ice and water. The resulting semi-solid material was extracted with ether and the ether solution washed successively with dilute hydrochloric acid, dilute sodium bicarbonate solution, water, then dried and concentrated to a small volume. Skellysolve B was added and the remainder of the ether evaporated. Cooling the solution gave 165 mg. of crystals melting at 128 to 130° C. Two recrystallizations of this material from a mixture of acetone and Swellysolve B gave 131 mg. of the desired product, 11α-acetoxy-5-pregnene-1,3,20-trione 3-ethylene ketal (XI), with a melting point of 153 to 155° C. and a rotation $[\alpha]_D$ of +21° (acetone).

*Analysis.*—Calcd. for $C_{25}H_{34}O_6$: C, 69.74; H, 7.96. Found: C, 69.75; H, 8.06.

Following the procedure of Example 5 but substituting as starting material for 11α-hydroxy-5-pregnene-1,3,20-trione 3-ethylene ketal (VI), other 3-alkylene ketals of 11α - hydroxy-5-pregnene-1,3,20-trione (VI), yields the corresponding 11α - acetoxy-5-pregnene-1,3,20-trione 3-alkylene ketal (XI).

Following the procedure of Example 5, but substituting another lower-hydrocarbon carboxylic acid anhydride for acetic anhydride, is productive of other 11α-acyloxy-1,3,-11-trione 3-ethylene ketals. For example, the anhydrides of propionic, diethylacetic, propiolic, β-cyclopentylpropionic, methylbenzoic and phenylacetic acids can be employed to produce the corresponding 11α-propionate, 11α-diethylacetate, 11α-propiolate, etc.

Following the procedure of Example 5, but substituting for 11α-hydroxy-5-pregnene-1,3,20-trione 3-ethylene ketal (VI), the following starting materials:

(1) an 11α - hydroxy-6-methyl-5-pregnene-1,3,20 - trione 3-alkylene ketal (VI),
(2) an 11α-hydroxy-16α-methyl-5-pregnene-1,3,20-trione 3-alkylene ketal (VI),
(3) an 11α-hydroxy-16β-methyl-5-pregnene-1,3,20-trione 3-alkylene ketal (VI),
(4) a 6,16α - dimethyl-11α-hydroxy-5-pregnene - 1,3,20-trione 3-alkylene ketal (VI),
(5) a 6,16β - dimethyl-11α-hydroxy-5-pregnene - 1,3,20-trione 3-alkylene ketal (VI) and
(6) a 5-androstene-11α-hydroxy-1,3,17-trione 3-alkylene ketal, yields, respectively, (1) an 11α-acyloxy-6-methyl-5-pregnene-1,3,11-trione 3-alkylene ketal (XI),
(2) an 11α-acyloxy-16α-methyl-5-pregnene-1,3,20-trione 3-alkylene ketal (XI),
(3) an 11α-acyloxy-16β-methyl-5-pregnene-1,3,20-trione 3-alkylene ketal (XI),
(4) an 11α - acyloxy-6,16α-dimethyl-5-pregnene-1,3,20-trione 3-alkylene ketal (XI),
(5) an 11α - acyloxy-6,16β-dimethyl-5-pregnene-1,3,20-trione 3-alkylene ketal (XI) and
(6) an 11α - acyloxy-5-androstene-1,3,17-trione 3 - alkylene ketal.

EXAMPLE 6

*11α-hydroxy-5-pregnene-1,3,20-trione 3,20 - bis(ethylene ketal) (IX)*

A solution of 1 g. of 11α-hydroxy-5-pregnene-1,3,20-trione 3-ethylene ketal (VI) [from Example 3(a)], 50 mg. p-toluene-sulfonic acid monohydrate and 10 ml. of ethylene glycol in 100 ml. of benzene was stirred and heated at reflux temperature for a period of about 3 hours. The water formed during the reaction was removed by a water trap. The mixture was cooled, washed with water and the benzene layer dried and chromatographed over a column of Florisil. The fraction containing the desired product (IX) was eluted from the column with a mixture of 10% acetone in Skellysolve B to give 316 mg. of material; this was recrystallized twice from acetone and ethyl acetate to yield 268 mg. of 11α-hydroxy-5-pregnene-1,3,20-trione 3,20-bis(ethylene ketal) (IX) with a melting point of 163 to 166° C. and a rotation $[\alpha]_D$ of +43° (acetone).

*Analysis.*—Calcd. for $C_{25}H_{36}O_6$: C, 69.42; H. 8.39. Found: C, 69.73; H, 8.42.

Following the procedure of Example 6, but substituting as starting material for 11α-hydroxy-5-pregnene-1,3,20-trione 3-ethylene ketal (VI), other 3-alkylene ketals of 11α-hydroxy-5-pregnene-1,3,20-trione (VI), and another alkanediol for ethylene glycol, yields the corresponding 11α-hydroxy-5-pregnene-1,3,20-trione 3,20 - bis(alkylene ketal) (IX).

Following the procedure of Example 6, but substituting for 11α-hydroxy-5-pregnene-1,3,20-trione 3-ethylene ketal (VI), the following starting materials:

(1) an 11α-hydroxy-6-methyl-5-pregnene-1,3,20-trione 3-alkylene ketal (VI),
(2) an 11α-hydroxy-16α-methyl-5-pregnene-1,3,20-trione 3-alkylene ketal (VI),
(3) an 11α-hydroxy-16β-methyl-5-pregnene-1,3,20-trione 3-alkylene ketal (VI),
(4) a 6,16α-dimethyl-11α-hydroxy-5-pregnene-1,3,20-trione 3-alkylene ketal (VI),
(5) a 6,16β-dimethyl-11α-hydroxy-5-pregnene-1,3,20-trione 3-alkylene ketal (VI) and (6) a 5-androstene-11α-hydroxy-1,3,17-trione 3-alkylene ketal, yields, respectively, (1) an 11α-hydroxy-6-methyl-5-pregnene-1,3,20-trione 3,20-bis(alkylene ketal) (IX),
(2) an 11α-hydroxy-16α-methyl-5-pregnene-1,3,20-trione 3,20-bis(alkylene ketal) (IX),
(3) an 11α-hydroxy-16β-methyl-5-pregnene-1,3,20-trione 3,20-bis(alkylene ketal) (IX),
(4) a 6,16α-dimethyl-11α-hydroxy-5-pregnene-1,3,20-trione 3,20-bis(alkylene ketal) (IX),
(5) a 6,16β-dimethyl-11α-hydroxy-5-pregnene-1,3,20-trione 3,20-bis(alkylene ketal) (IX) and
(6) a 5-androstene-11α-hydroxy-1,3,17-trione 3,17-bis (alkylene ketal).

EXAMPLE 7

*1β,11α-dihydroxy-1α-methyl-5-pregnene-3,20 - dione 3,20-bis(ethylene ketal) (XI)*

(a) A solution of 528 mg. of 11α-hydroxy-5-pregnene-1,3,20-trione 3-ethylene ketal (IX) (from Example 6) in 20 ml. of tetrahydrofuran was added dropwise to 8 ml. of a 3 molar solution of methyl magnesium bromide in ether. The mixture was heated at reflux temperature for a period of about 4.5 hours and then cooled, diluted with ether and then poured into a saturated solution of ammonium chloride. The ether layer was separated, washed with water, dried, evaporated to dryness and chromatographed over a column of Florisil. The main fraction, containing 241 mg. of the desired product (XII), was eluted with 20% acetone in Skellsolve B; it was recrystallized once from a mixture of acetone and Skellsolve B and twice from ethyl acetate to give 93 mg. of pure 1β,11α-dihydroxy-1α-methyl-5-pregnene-3,20-dione -3,20 bis(ethylene ketal) (XII) with a melting point of 186 to 189° C.

*Analysis.*—Calcd. for $C_{28}H_{40}O_6$: C, 69.61; H, 8.99. Found: C, 70.05; H, 9.04.

(b) A solution of 0.5 g. of 11α-hydroxy-5-pregnene-1,3,20-trione 3-ethylene ketal (XI) (from Example 6) in 50 ml. of anhydrous ether was added dropwise to 20 ml. of a 1.05 molar solution of methyl lithium in anhydrous ether. The mixture was stirred for a period of about 17 hours and then poured into a mixture of about 100 ml. of ice and water. The ether phase was separated and the aqueous phase extracted with ether and then with ethyl acetate. The extracts were combined with the previously separated ether phase and the pooled extracts washed with water, dried and evaporated to dryness. The residue was chromatographed over a column of Florisil and eluted with a mixture of Skellysolve B and acetone (80:20) to give 387 mg. of the desired product (XII). Two crystallizations from a mixture of acetone and Skellysolve B gave 291 mg. of pure 1β,11α-dihydroxy-1α-methyl-5-pregnene-3,20-dione 3,20-bis(ethylene ketal) (XII) with a melting point of 183 to 188° C.

Following the procedures of Examples 7(a) and 7(b) but substituting as starting material for 11α-hydroxy-5-pregnene-1,3,20-trione 3,20-bis(ethylene ketal) (IX), other 3,20-bis(alkylene ketals) of 11α-hydroxy-5-pregnene-1,3,20-trione (IX), yields the corresponding 1β,11α-dihydroxy-1α-methyl-5-pregnene-3,20-dione 3,20-bis(alkylene ketal) (XII).

Following the procedure of Example 7(a) but substituting for methyl magnesium bromide another alkyl (or aryl) magnesium halide, yields the corresponding alkyl or aryl substituent at C–1. For example, substituting for methyl magnesium bromide, the following Grignard reagents:

(1) ethyl magnesium iodide,
(2) n-propyl magnesium chloride,
(3) phenyl magnesium bromide and
(4) methoxyphenyl magnesium bromide, yields, respectively, (1) 1β,11α-dihydroxy-1α-ethyl-5-pregnene-3,20-dione 3,20-bis(alkylene ketal) (XII),
(2) 1β,11α - dihydroxy-1α-n-propyl-5-pregnene-3,20-dione 3,20-bis(alkylene ketal) (XII),
(3) 1β,11α - dihydroxy-1α-phenyl-5-pregnene-3,20-dione 3,20-bis(alkylene ketal) (XII) and
(4) 1β,11α - dihydroxy - 1α-methoxyphenyl-5-pregnene-3,20-dione 3,20-bis(alkylene ketal) (XII).

Following the procedure of Example 7(b) but substituting for methyl lithium another alkyl (or aryl) lithium, yields the corresponding alkyl or aryl substituent at C–1. For example, substituting for methyl lithium, the following alkyl (or aryl) lithiums:

(1) ethyl lithium
(2) i-butyl lithium,
(3) phenyl lithium and
(4) methoxyphenyl lithium, yields, respectively, (1) 1β,11α - dihydroxy-1α-ethyl-5-pregnene-3,20-dione 3,20-bis(alkylene ketal) (XII),
(2) 1β,11α - dihydroxy - 1α-i-butyl-5-pregnene-3,20-dione 3,20-bis(alkylene ketal) (XII),
(3) 1β,11α - dihydroxy - 1α-phenyl-5-pregnene-3,20-dione 3,20-bis(alkylene ketal) (XII) and
(4) 1β,11α - dihydroxy - 1α-methoxyphenyl-5-pregnene-3,20-dione 3,20-bis(alkylene ketal) (XII).

Following the procedures of Examples 7(a) and 7(b), but substituting for 11α-hydroxy-5-pregnene-1,3,20-trione 3,20-bis (alkylene ketal) (IX), the following starting materials:

(1) an 11α-hydroxy-6-methyl-5-pregnene-1,3,20-trione 3,20-bis (alkylene ketal) (IX),
(2) an 11α-hydroxy-16α-methyl-5-pregnene-1,3,20-trione 3,20-bis (alkylene ketal) (IX),
(3) an 11α-hydroxy-16β-methyl-5-pregnene-1,3,20-trione 3,20-bis (alkylene ketal) (IX),
(4) a 6,16α-dimethyl-11α-hydroxy-5-pregnene-1,3,20-trione 3,20-bis (alkylene ketal) (IX),
(5) a 6,16β-dimethyl-11α-hydroxy-5-pregnene-1,3,20-trione 3,20-bis (alkylene ketal) (IX) and
(6) a 5-androstene-11α-hydroxy-1,3,17-trione 3,17-bis (alkylene ketal), yields, respectively, (1) a 1α-alkyl (or aryl)-1β,11α-dihydroxy-6-methyl-5-pregnene-3,20-dione 3,20-bis (alkylene ketal) (XII),
(2) a 1α-alkyl (or aryl)-1β,11α-dihydroxy-16α-methyl-5-pregnene-3,20-dione 3,20-bis (alkylene ketal) (XII),
(3) a 1α-alkyl (or aryl)-1β,11α-dihydroxy-16β-methyl-5-pregnene-3,20-dione 3,20-bis (alkylene ketal) (XII),
(4) a 1α-alkyl (or aryl)-1β,11α-dihydroxy-6,16α-dimethyl-5-pregnene-3,20-dione 3,20-bis (alkylene ketal) (XII),
(5) a 1α-alkyl (or aryl)-1β,11α-dihydroxy-6,16β-dimethyl-5-pregnene-3,20-dione 3,20-bis (alkylene ketal) (XII) and
(6) a 1α-alkyl (or aryl)-5-androstene-1β,11α-dihydroxy-3,17-dione 3,17-bis (alkylene ketal).

EXAMPLE 8

*1β-Hydroxy-1α-Methyl-5-Pregnene-3,11,20-Trione 3,20-Bis (Ethylene Ketal) (XIII)*

120 mg. of 1β,11α-dihydroxy-1α-methyl - 5 - pregnene-3,20-dione 3,20-bis (ethylene ketal) (XII) (from Example 7) in 2.5 ml. of pyridine was oxidized with chromium trioxide to 2.5 ml. of pyridine) in the manner disclosed in Example 4. The mixture was allowed to stand at room temperature for a period of about 16 hours. The reaction mixture was diluted with about 100 ml. of water and extracted with ethyl acetate. The ethyl acetate solution was washed with dilute hydrochloric acid and with water and then dried and evaporated to dryness to give a crude solid. Crystallization from a mixture of acetone and Skellysolve B gave 84 mg. of 1β-hydroxy-1α-methyl-5-pregnene-3,11,20-trione 3,20-bis (ethylene ketal) (XIII) with a melting point of 180 to 184° C.

Analysis.—Calcd. for $C_{26}H_{38}O_6$: C, 69.93; H, 8.58. Found: C, 70.16; H, 8.85.

Following the procedure of Example 7 but substituting as starting material for 1β,11α-dihydroxy-1α-methyl-5-pregnene-3,20-dione 3,20-bis (ethylene ketal) (XII), other 3,20-bis (alkylene ketals) of 1β,11α-dihydroxy-1α-methyl-5-pregnene-3,20-dione (XII), yields the corresponding 1β-hydroxy-1α-methyl-5-pregnene-3,11,20-trione 3,20-bis (alkylene ketal) (XIII).

Following the procedure of Example 8, but substituting for 1β,11α-dihydroxy-1α-methyl-5-pregnene-3,20-dione 3,20-bis (alkylene ketal) (XII), the following starting materials:

(1) a 1α-alkyl (or aryl)-1β,11α-dihydroxy-6-methyl-5-pregnene-3,20-dione 3,20-bis (alkylene ketal) (XII),
(2) a 1α-alkyl (or aryl)-1β,11α-dihydroxy-16α-methyl-5-pregnene-3,20-dione 3,20-bis (alkylene ketal) (XII),
(3) a 1α-alkyl (or aryl)-1β,11α-dihydroxy-16β-methyl-5-pregnene-3,20-dione 3,20-bis (alkylene ketal) (XII),
(4) a 1α-alkyl (or aryl)-1β,11α-dihydroxy-6,16α-dimethyl-5-pregnene-3,20-dione 3,20-bis (alkylene ketal) (XII),
(5) a 1α-alkyl (or aryl)-1β,11α-dihydroxy-6,16β-dimethyl-5-pregnene-3,20-dione 3,20-bis (alkylene ketal) (XII) and
(6) a 1α-alkyl (or aryl)-5-androstene-1β,11α-dihydroxy-3,17-dione 3,17-bis (alkylene ketal), yields, respectively, (1) a 1α-alkyl (or aryl)-1β-hydroxy-6-methyl-5-pregnene-3,11,20-trione 3,20-bis (alkylene ketal) (XIII),
(2) a 1α-alkyl (or aryl)-1β-hydroxy-16α-methyl-5-pregnene-3,11,20-trione 3,20-bis (alkylene ketal) (XIII),
(3) a 1α-alkyl (or aryl)-1β-hydroxy-16β-methyl-5-pregnene-3,11,20-trione 3,20-bis (alkylene ketal) (XIII),
(4) a 1α-alkyl (or aryl)-6,16α-dimethyl-1β-hydroxy-5-pregnene-3,11,20-trione 3,20-bis (alkylene ketal) (XIII),
(5) a 1α-alkyl (or aryl)-6,16β-dimethyl-1β-hydroxy-5-pregnene-3,11,20-trione 3,20-bis (alkylene ketal) (XIII) and
(6) a 1α-alkyl (or aryl)-5-androstene-1β-hydroxy-3,11,17-trione 3,17-bis (alkylene ketal).

EXAMPLE 9

*1β-Hydroxy-1α-Methyl-4-Pregnene-3,11,20-Trione (1β-Hydroxy-1α-Methyl-11-Ketoprogesterone) (XIV)*

One drop of sulfuric acid in 1 ml. of water was added to a solution of 90 ml. of 1β-hydroxy-1α-methyl-5-pregnene-3,11,20-trione 3,20-bis (ethylene ketal) (XIII) (from Example 8) in 5 ml. of acetone. The reaction mixture was allowed to boil gently for a period of about 10 minutes and then poured into a mixture of ice and water. The water was extracted with ether and with ethyl acetate and the extracts combined; the pooled extracts were washed with dilute sodium bicarbonate solution and water, dried and evaporated to dryness under reduced pressure with the bath temperature at 40 to 50° C. The residue, after chromatography over a column of Florisil, gave 32 mg. of crystalline 1β-hydroxy-1α-methyl-4-pregnene-3,11,20-trione (XIV) with a melting point of 199 to 203° C.

Following the procedure of Example 9, but substituting as starting material for 1β-hydroxy-1α-methyl-5-pregnene-3,11,20-trione 3,20-bis (ethylene ketal) (XIII), other 3,20-bis (alkylene ketals) of 1β-hydroxy-1α-methyl-5-pregnene-3,11,20-trione (XIII), also yields 1β-hydroxy-1α-methyl-4-pregnene-3,11,20-trione (XIV).

Following the procedure of Example 9, but substituting for 1β-hydroxy-1α-methyl-4-pregnene-3,11,20-trione (XIII), the following starting materials:

(1) a 1α-alkyl (or aryl)-1β-hydroxy-6-methyl-5-pregnene-3,11,20-trione 3,20-bis (alkylene ketal) (XIII),
(2) a 1α-alkyl (or aryl)-1β-hydroxy-16α-methyl-5-pregnene-3,11,20-trione 3,20-bis (alkylene ketal) (XIII),
(3) a 1α-alkyl (or aryl)-1β-hydroxy-16β-methyl-5-pregnene-3,11,20-trione-3,20-bis (alkylene ketal) (XIII),
(4) 1α-alkyl (or aryl)-6,16α-dimethyl-1β-hydroxy-5-pregnene-3,11,20-trione 3,20-bis (alkylene ketal) (XIII),
(5) a 1α-alkyl (or aryl)-6,16β-dimethyl-1β-hydroxy-5-pregnene-3,11,20-trione 3,20-bis (alkylene ketal) (XIII) and
(6) a 1α-alkyl (or aryl)-5-androstene-1β-hydroxy-3,11,17-trione 3,17-bis (alkylene ketal), yields, respectively, (1) a 1α-alkyl (or aryl)-1β-hydroxy-6-methyl-4-pregnene-3,11,20-trione (XIV),
(2) a 1α-alkyl (or aryl)-1β-hydroxy-16α-methyl-4-pregnene-3,11,20-trione (XIV),
(3) a 1α-alkyl (or aryl)-1β-hydroxy-16β-methyl-4-pregnene-3,11,20-trione (XIV),
(4) a 1α-alkyl (or aryl)-6,16α-dimethyl-1β-hydroxy-4-pregnene-3,11,20-trione (XIV),
(5) a 1α-alkyl (or aryl)-6,16β-dimethyl-1β-hydroxy-4-pregnene-3,11,20-trione (XIV) and
(6) a 1α-alkyl (or aryl)-4-androstene-1β-hydroxy-3,11,17-trione.

EXAMPLE 10

*1-Methyl-1,4-Pregnadiene-3,11,20-Trione (1-Dehydro-1-Methyl-11-Ketoprogesterone) (XV)*

A solution of 20 mg. of 1β-hydroxy-1α-methyl-4-pregnene-3,11,20-trione (XIV) (from Example 9) in 2.5 ml. of acetic acid was heated at reflux temperature for a period of about 1 hour. The acetic acid was removed from the reaction mixture by blowing a stream of nitrogen over it and the resulting residue decolorized with Nuchar (activated carbon) in acetone. Two crystallizations from acetone and from ether gave 6 mg. of 1-methyl-1,4-pregnadiene-3,11,20-trione (XV) with a melting point of 195 to 198° C.

Following the procedure of Example 10 but substituting for 1β-hydroxy-1α-methyl-4-pregnene-3,11,20-trione (XIV), the following starting materials:

(1) a 1α-alkyl (or aryl)-1β-hydroxy-6-methyl-4-pregnene-3,11,20-trione (XIV),
(2) a 1α-alkyl (or aryl)-1β-hydroxy-16α-methyl-4-pregnene-3,11,20-trione (XIV),
(3) a 1α-methyl (or aryl)-1β-hydroxy-16β-methyl-4-pregnene-3,11,20-trione (XIV),
(4) a 1α-alkyl (or aryl)-6,16α-dimethyl-1β-hydroxy-4-pregnene-3,11,20-trione (XIV),
(5) a 1α-alkyl (or aryl)-6,16β-dimethyl-1β-hydroxy-4-pregnene-3,11,20-trione (XIV) and
(6) a 1α-alkyl (or aryl)-4-androstene-1β-hydroxy-3,11,17-trione, yields, respectively, (1) a 1-alkyl (or aryl)-6α-methyl-1,4-pregnadiene-3,11,20-trione (XV),
(2) a 1-alkyl (or aryl)-16α-methyl-1,4-pregnadiene-3,11,20-trione (XV),
(3) a 1-alkyl (or aryl)-16β-methyl-1,4-pregnadiene-3,11,20-trione (XV),
(4) a 1-alkyl (or aryl)-6,16α-dimethyl-1,4-pregnadiene-3,11,20-trione (XV),
(5) a 1-alkyl (or aryl)-6,16β-dimethyl-1,4-pregnadiene-3,11,20-trione (XV) and (6) a 1-alkyl(or aryl)-1,4-androstadiene-3,11,17-trione.

I claim:
1. A process for the production of a compound of the formula (XV)

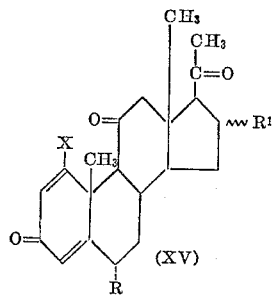

wherein X is selected from the group consisting of alkyl and aryl radicals containing from one to eight carbon atoms, inclusive; R and R¹ are selected from the group consisting of hydrogen and methyl, which comprises the steps of (1) subjecting a compound of the formula I

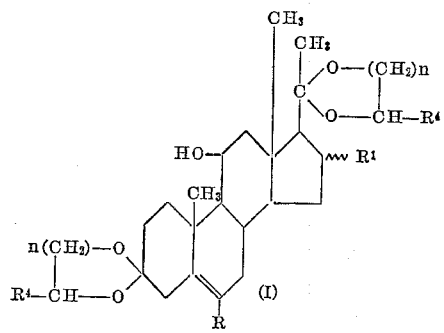

wherein R and R¹ have the same meanings as above; n is an integer selected from the integers one and two; R⁴ is selected from the group consisting of hydrogen and a lower-alkyl radical containing from one to six carbon atoms, inclusive, to 11α-nitroylation to yield a compound of the Formula II

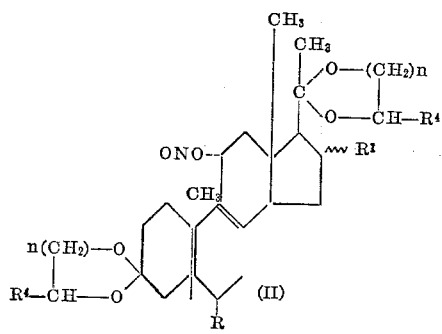

wherein R, R¹, R⁴ and n have the same meanings as above; (2) subjecting a thus-produced compound of Formula II to irradiation with ultraviolet light to obtain a compound of the Formula III

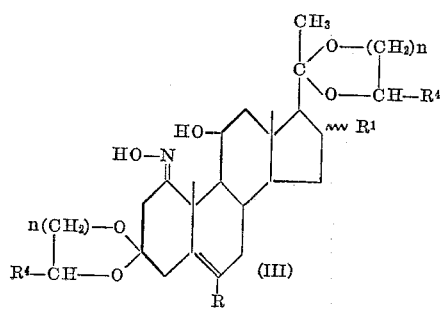

wherein R, R¹, R⁴ and n have the same meanings as above; (3) selectively hydrolyzing under mild reaction conditions a thus-produced compound of Formula III to yield a compound of the Formula VI

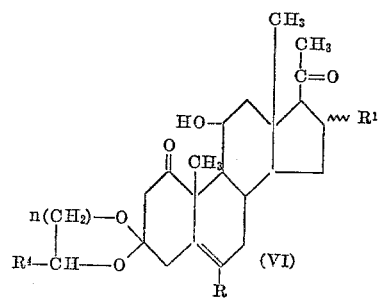

wherein R, R¹, R⁴ and n have the same meanings as above; (4) subjecting a thus-produced compound of Formula VI to 20-ketalization by reaction, in the presence of an acid catalyst, with an alkanediol of the formula

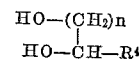

wherein R⁴ and n have the same meanings as above to yield a compound of the Formula IX

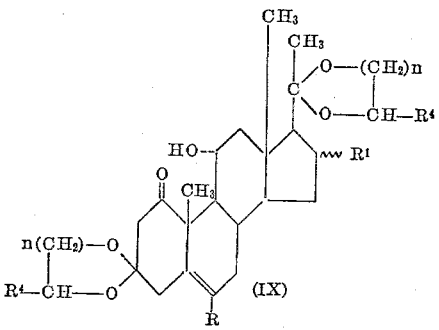

wherein R, R¹, R⁴ and n have the same meanings as above; (5) treating a thus-produced compound of Formula IX with a reagent selected from the group consisting of an alkyl lithium, an aryl lithium, an alkyl magnesium halide and an aryl magnesium halide, wherein the alkyl and aryl radicals contain from one to eight carbon atoms, inclusive, to give a compound of the Formula XII

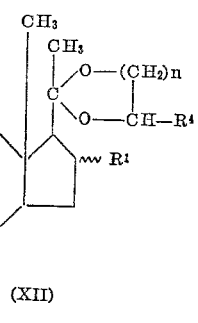

wherein R, R¹, R⁴, n and X have the same meanings as above; (6) treating a thus-produced compound of Formula XII with an oxidizing agent to obtain a compound of the Formula XIII

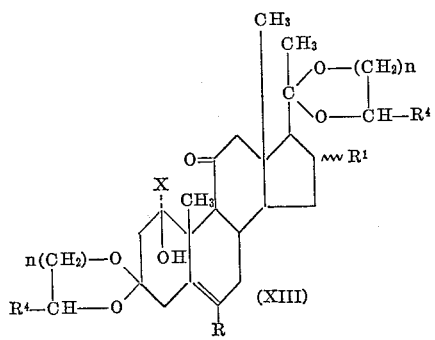

wherein R, R¹, R⁴, n and X have the same meanings as above; (7) hydrolyzing the 3- and 20-ketal groups of a thus-produced compound of Formula XIII to give a compound of the Formula XIV

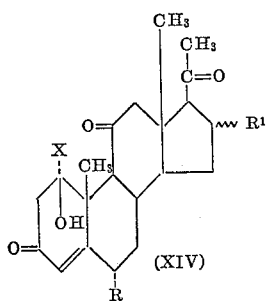

wherein R, R¹ and X have the same meanings as above, and (8) dehydrating a thus-produced compound of Formula XIV to obtain a compound of Formula XV, above.

2. A process for the production of a compound of the Formula XV.

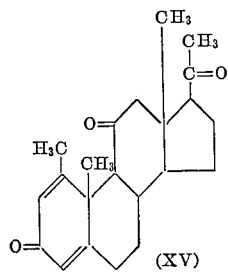

which comprises: (1) treating the compound of the Formula I

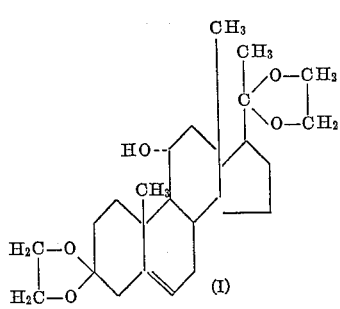

with nitrosyl chloride to yield the compound of the Formula II

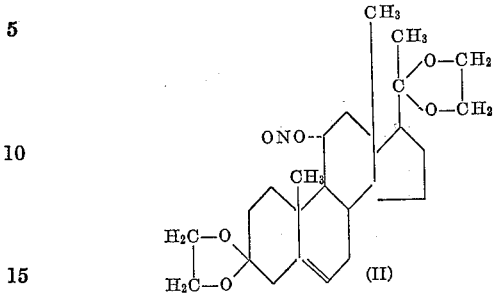

(2) subjecting the thus-produced compound of Formula II to irradiation with ultraviolet light to obtain a compound of the Formula III

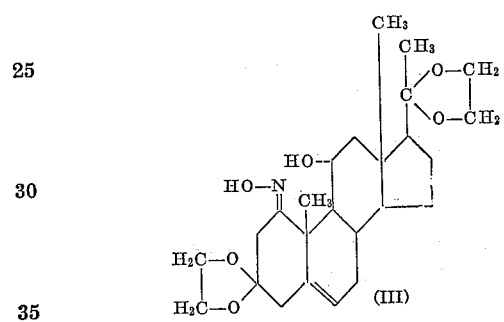

(3) treating the thus-produced compound of Formula III with sulfuric acid under mild reaction conditions to yield the compound of the Formula VI

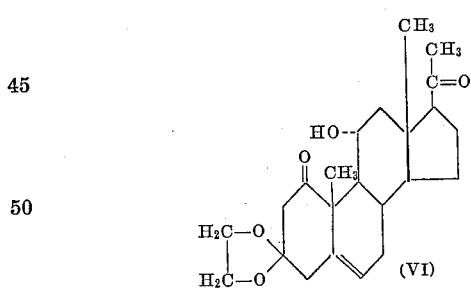

(4) treating the compound of Formula VI with ethylene glycol in the presence of p-toluenesulfonic acid to give the compound of the Formula IX

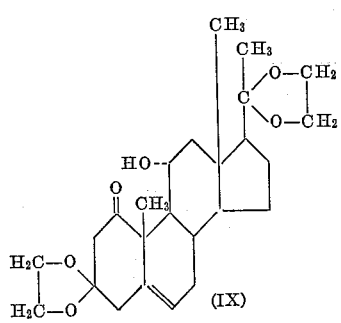

(5) treating the thus-produced compound of Formula IX with methyl magnesium bromide to yield the compound of the Formula XII and

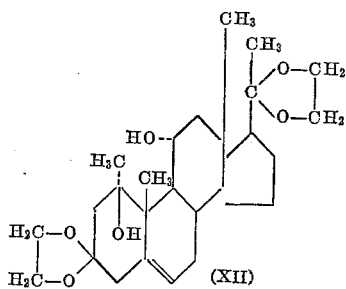

(6) treating the thus-produced compound of Formula XII with chromium trioxide to obtain the compound of the Formula XIII wherein R and R¹ are selected from the group consisting of hydrogen and methyl; R⁴ is selected from the group consisting of hydrogen and a lower-alkyl radical containing from one to six carbon atoms, inclusive; R⁵ is a lower-alkylene radical containing from one to six carbon atoms, inclusive; n is an integer selected from the integers one and two, which comprises subjecting a compound of the Formula III (7) treating the thus-produced compound of Formula XIII with sulfuric acid to give the compound of the Formula XIV wherein R, R¹, R⁴ and n have the same meanings as above, to selective hydrolysis under mild reaction conditions.

4. Compounds of the formula and (8) heating the thus-produced compound of Formula XIV with acetic acid to obtain the compound of Formula XV, above.

3. A process for the production of compounds of the Formulae (VI), (VII) and (VIII)

wherein R and R¹ are selected from the group consisting of hydrogen and methyl and R⁵ is a lower-alkylene radical containing from one to six carbon atoms, inclusive.

5. A compound of the formula

6. Compounds of the formula

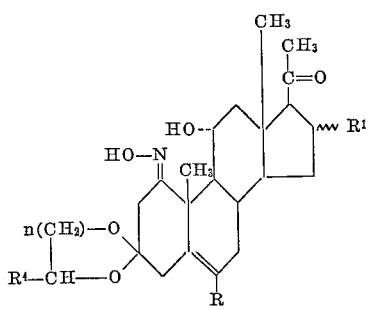

wherein $n$ is an interger selected from the integers one and two; R and $R^1$ are selected from the group consisting of hydrogen and methyl; $R^4$ is selected from the group consisting of hydrogen and a lower-alkyl radical containing from one to six carbon atoms, inclusive.

7. A compound of the formula

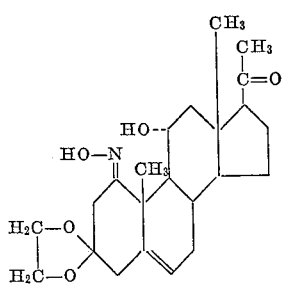

8. A process for the production of a compound of the formula (X)

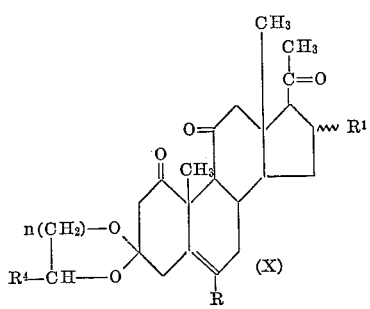

wherein R and $R^1$ are selected from the group consisting of hydrogen and methyl; $R^4$ is selected from the group consisting of hydrogen and a lower-alkyl radical containing from one to six carbon atoms, inclusive; $n$ is an integer selected from the integers one and two, which comprises oxidizing a compound of the Formula VI

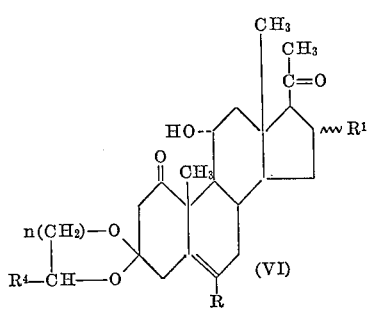

wherein R, $R^1$, $R^4$ and $n$ have the same meanings as above.

9. Compounds of the formula

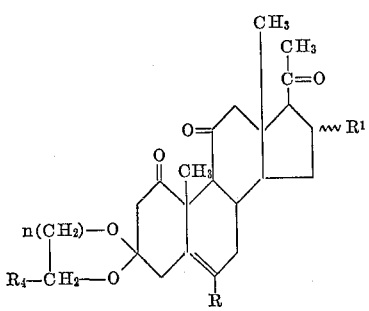

wherein $n$ is an integer selected from the integers one and two; R and $R^1$ are selected from the group consisting of hydrogen and methyl and $R^4$ is selected from the group consisting of hydrogen and a lower-alkyl radical containing from one to six carbon atoms, inclusive.

10. A compound of the formula

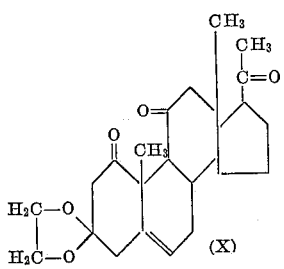

11. Compounds of the formula

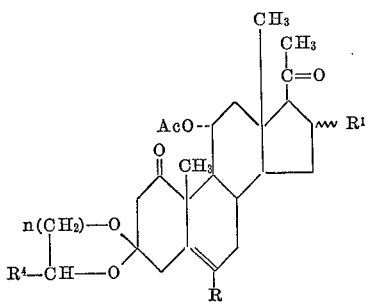

wherein $n$ is an integer selected from the integers one and two; R and $R^1$ are selected from the group consisting of hydrogen and methyl; $R^4$ is selected from the group consisting of hydrogen and a lower-alkyl radical containing from one to six carbon atoms, inclusive, and Ac is the acyl radical of a hydrocarbon carboxylic acid containing from one to twelve carbon atoms, inclusive.

12. A compound of the formula

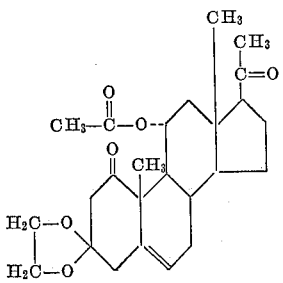

13. A process for the production of a compound of the Formula XV

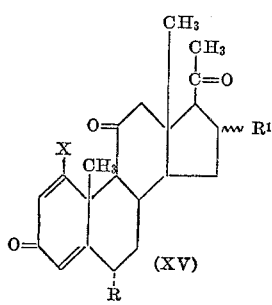

wherein X is selected from the group consisting of alkyl and aryl radicals containing from one to eight carbon atoms, inclusive; R and $R^1$ are selected from the group consisting of hydrogen and methyl, which comprises the steps of (1) subjecting a compound of the Formula VI

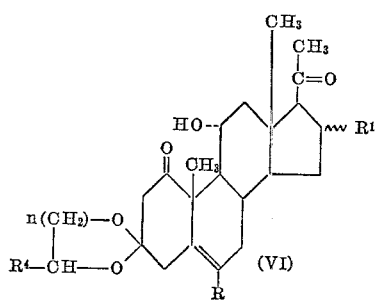

wherein R and $R^1$ have the same meanings as above; $R^4$ is selected from the group consisting of hydrogen and a lower-alkyl radical containing from one to six carbon atoms, inclusive; $n$ is an integer selected from the integers one and two, to 20-ketalization by reaction, in the presence of an acid catalyst, with an alkanediol of the formula

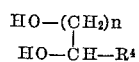

wherein $R^4$ and $n$ have the same meanings as above, to give a compound of the Formula IX

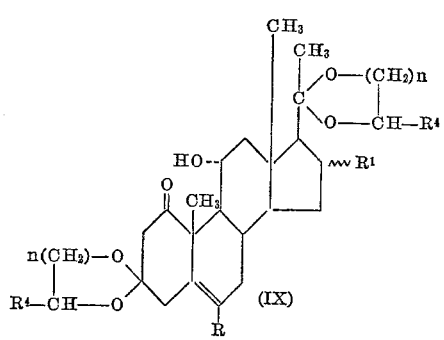

wherein R, $R^1$, $R^4$ and $n$ have the same meanings as above; (2) treating a thus-produced compound of Formula IX with a reagent selected from the group consisting of an alkyl lithium, an aryl lithium, an alkyl magnesium halide, and an aryl magnesium halide, wherein the alkyl and aryl radicals contain from one to eight carbon atoms, inclusive, to give a compound of the Formula XII

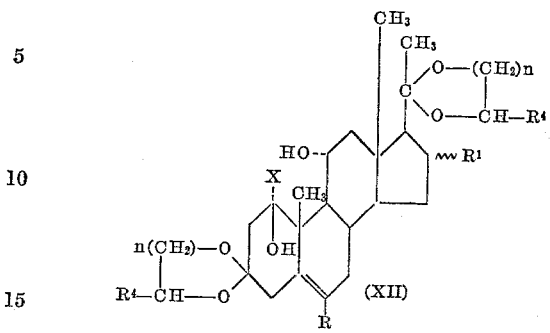

wherein R, $R^1$, $R^4$, $n$ and X have the same meanings as above; (3) treating a thus-produced compound of Formula XII with an oxidizing agent to obtain a compound of the Formula XIII

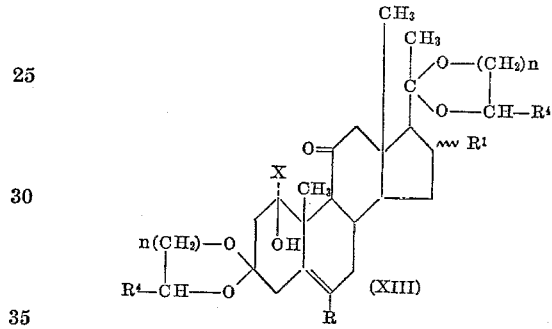

wherein R, $R^1$, $R^4$, $n$ and X have the same meanings as above; (4) hydrolyzing the 3- and 20-ketal groups of a thus-produced compound of Formula XIII to give a compound of the Formula XIV

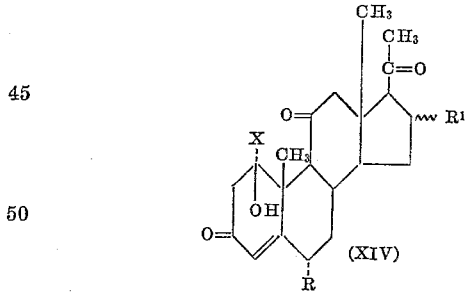

wherein R, $R^1$ and X have the same meanings as above, and (5) dehydrating a thus-produced compound of Formula XIV to obtain a compound of Formula XV, above.

14. A process for the production of a compound of the Formula XV

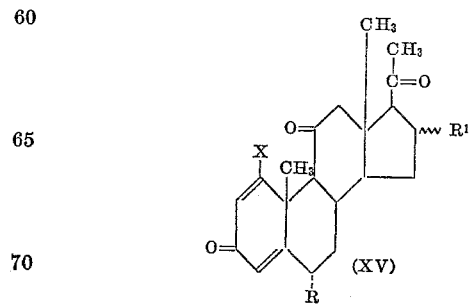

wherein X is selected from the group consisting of alkyl and aryl radicals containing from one to eight carbon atoms, inclusive; R and $R^1$ are selected from the group consisting of hydrogen and methyl, which comprises (1) treating a compound of the Formula IX

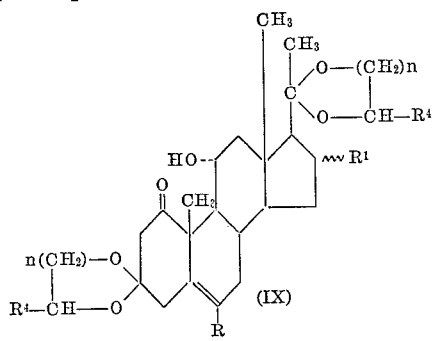

wherein R and R¹ have the same meanings as above; R⁴ is selected from the group consisting of hydrogen and a lower-alkyl radical containing from one to six carbon atoms, inclusive; $n$ is an integer selected from the integers one and two, with a reagent selected from the group consisting of an alkyl lithium, an aryl lithium, an alkyl magnesium halide and an aryl magnesium halide, wherein the alkyl and aryl radicals contain from one to eight carbon atoms, inclusive, to give a compound of the Formula XII

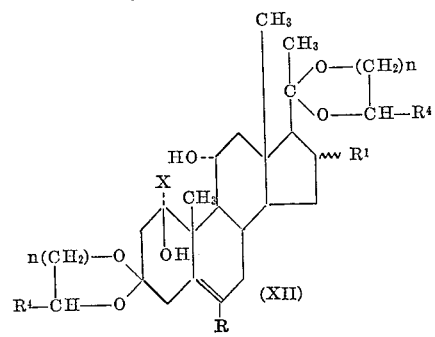

wherein R, R¹, R⁴, $n$ and X have the same meanings as above; (2) treating a thus-produced compound of Formula XII with an oxidizing agent to obtain a compound of the Formula XIII

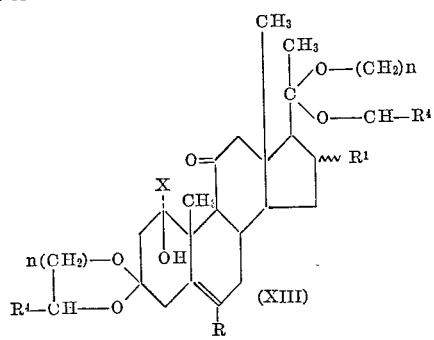

wherein R, R¹, R⁴, $n$ and X have the same meanings as above; (3) hydrolyzing the 3- and 20-ketal groups of a thus-produced compound of Formula XIII to give a compound of the Formula XIV

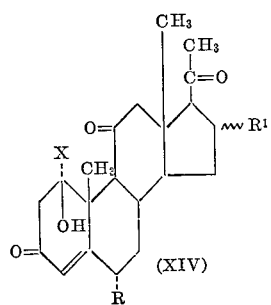

wherein R, R¹ and X have the same meanings as above, and (4) dehydrating a thus-produced compound of Formula XIV to obtain a compound of Formula XV, above.

15. A process for the production of a compound of the Formula XV

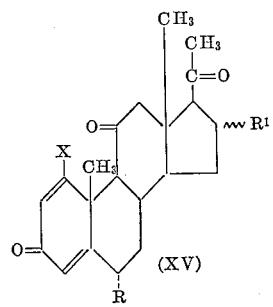

wherein X is selected from the group consisting of alkyl and aryl radicals containing from one to eight carbon atoms, inclusive; R and R¹ are selected from the group consisting of hydrogen and methyl, which comprises (1) treating a compound of the Formula XII

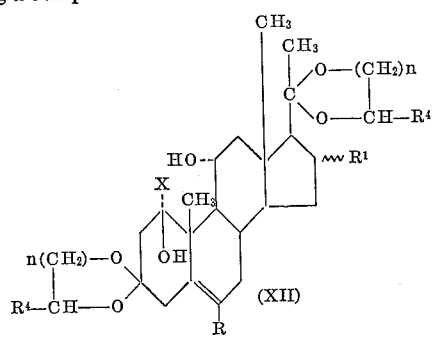

wherein X, R and R¹ have the same meanings as above; R⁴ is selected from the group consisting of hydrogen and a lower-alkyl radical containing from one to six carbon atoms, inclusive, $n$ is an integer selected from the integers one and two, with an oxidizing agent to obtain a compound of the Formula XIII

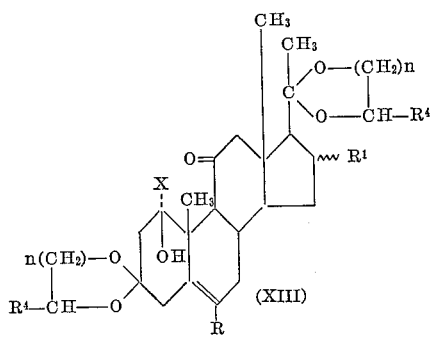

wherein R, R¹, R⁴, $n$ and X have the same meanings as above; (2) hydrolyzing the 3- and 20-ketal groups of a thus-produced compound of Formula XIII to give a compound of the Formula XIV

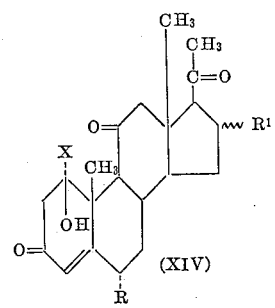

wherein R, R¹ and X have the same meanings as above, and (3) dehydrating a thus-produced compound of Formula XIV to obtain a compound of Formula XV, above.

16. A process for the production of a compound of the Formula XV

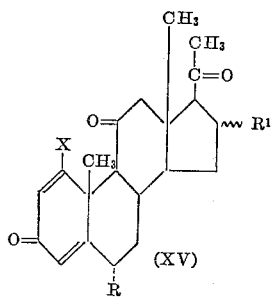

wherein X is selected from the group consisting of alkyl and aryl radicals containing from one to eight carbon atoms, inclusive; R and R¹ are selected from the group consisting of hydrogen and methyl, which comprises (1) hydrolyzing the 3- and 20-ketal groups of a compound of the Formula XIII

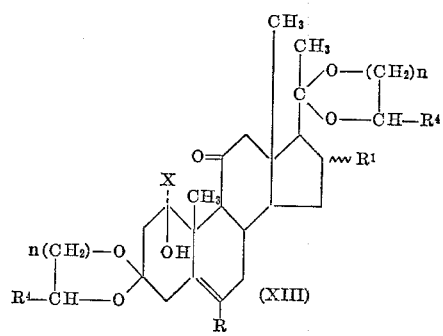

wherein R, R¹ and X have the same meanings as above; R⁴ is selected from the group consisting of hydrogen and a lower-alkyl radical containing from one to six carbon atoms, inclusive, n is an integer selected from the integers one and two, to give a compound of the Formula XIV

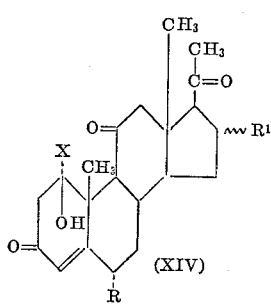

wherein R, R¹ and X have the same meanings as above, and (2) dehydrating a thus-produced compound of Formula XIV to obtain a compound of Formula XV, above.

17. A process for the production of a compound of the formula

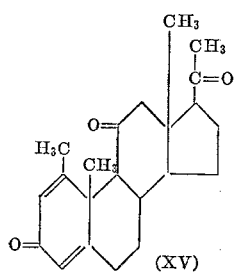

which comprises (1) treating the compound of Formula XIII

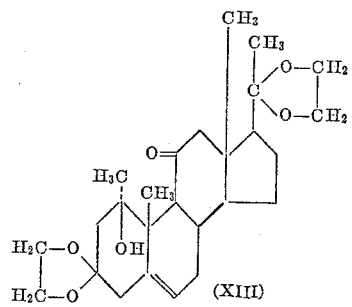

with sulfuric acid to give the compound of the Formula XIV

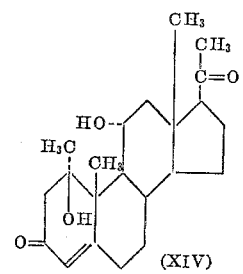

and (2) heating the thus-produced compound of Formula XIV with acetic acid to obtain the compound of Formula XV, above.

18. A process for the production of a compound of the Formula XV

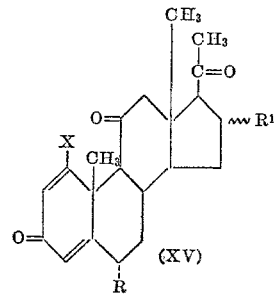

wherein X is selected from the group consisting of alkyl and aryl radicals containing from one to eight carbon atoms, inclusive; R and R¹ are selected from the group consisting of hydrogen and methyl, which comprises dehydrating a compound of the Formula XIV

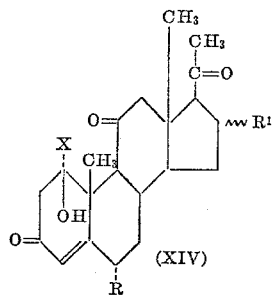

wherein R, R¹ and X have the same meanings as above.

19. A process for the production of a compound of the Formula XV
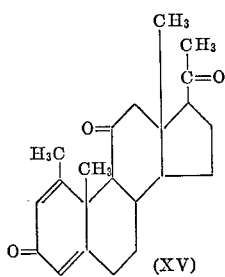
(XV)
which comprises heating the compound of the Formula XIV
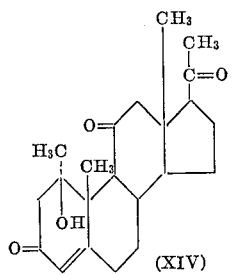
(XIV)
with acetic acid.
References Cited in the file of this patent
Loewenthal: Tetrahedron, vol. 6, No. 4, 1959, pp. 299–302.

UNITED STATES PATENT OFFICE
CERTIFICATE OF CORRECTION

Patent No. 3,117,120          January 7, 1964

George B. Spero

It is hereby certified that error appears in the above numbered patent requiring correction and that the said Letters Patent should read as corrected below.

Column 6, line 23, for "invert" read -- inert --; line 62, for "1,3,20-tetrone" read -- 1,3,11,20-tetrone --; column 8, line 13, for "hydroxy" read -- hydroxyl --; line 74, for "13,20-trione" read -- 1,3,20-trione --; column 9, line 64, for "320-bis" read -- 3,20-bis --; column 11, line 10, for "solution 900 mg." read -- solution of 900 mg. --; column 12, line 41, for "16αmethyl" read -- 16α-methyl --; line 47, for "6,16β-methyl" read -- 6,16β-dimethyl --; line 49, for "1,2,17-trione" read -- 1,3,17-trione --; column 13, line 56, for "Swellysolve B" read -- Skellysolve B --; column 15, line 33, for "Skellsolve B" read -- Skellysolve B --; column 16, line 69, for "trioxide to 2.5 ml. of pyridine) in" read -- trioxide-pyridine complex (prepared by adding 240 mg. of chromium trioxide to 2.5 ml. of pyridine) in --; column 19, lines 45 to 57, the formula should appear as shown below instead of as in the patent:

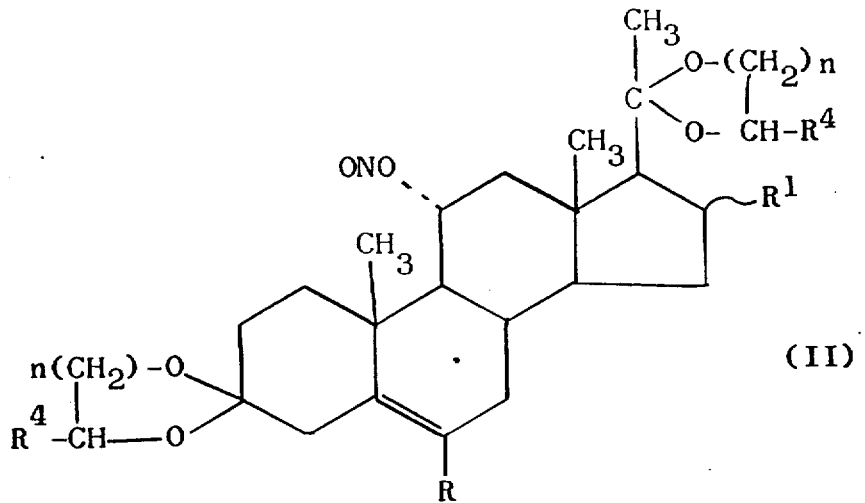

(II)

con't column 20, lines 59 to 72, the formula should appear as shown below instead of as in the patent:

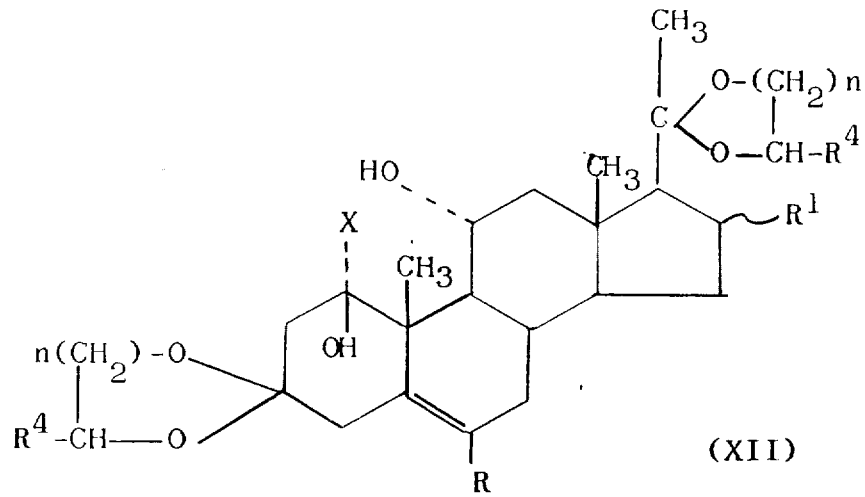

(XII)

column 23, line 48, for "aceti cacid" read -- acetic acid --;
column 24, lines 45 to 57, the formula should appear as shown below instead of as in the patent:

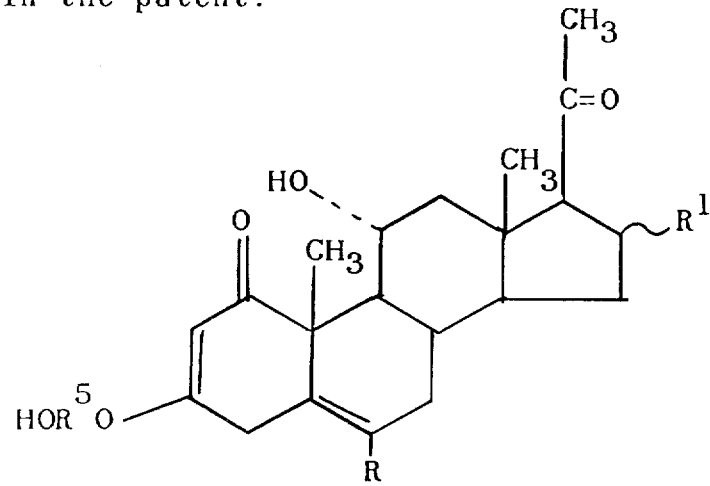

Signed and sealed this 21st day of July 1964.

(SEAL)
Attest:

ESTON G. JOHNSON
Attesting Officer

EDWARD J. BRENNER
Commissioner of Patents